United States Patent [19]

Kivel et al.

[11] Patent Number: 4,537,926

[45] Date of Patent: Aug. 27, 1985

[54] AQUEOUS CHIP RESISTANT COATING COMPOSITION

[75] Inventors: Daniel M. Kivel, Troy; Gerhard M. Weber, Detroit, both of Mich.

[73] Assignee: Grow Group, Inc., New York, N.Y.

[21] Appl. No.: 597,671

[22] Filed: Apr. 6, 1984

Related U.S. Application Data

[62] Division of Ser. No. 417,857, Sep. 14, 1982, Pat. No. 4,456,507, which is a division of Ser. No. 275,901, Jun. 22, 1981, abandoned.

[51] Int. Cl.$^3$ ......................... C08K 5/05; C08L 37/00

[52] U.S. Cl. .................................... 524/388; 524/517; 524/522; 524/523; 524/526; 524/548; 524/558; 524/559; 524/560; 524/563; 524/564

[58] Field of Search ............... 524/548, 563, 564, 388, 524/522, 517, 526, 523, 559, 558, 560

[56] References Cited

U.S. PATENT DOCUMENTS

| | | | |
|---|---|---|---|
| 3,879,326 | 4/1975 | Burke, Jr. | 523/319 |
| 4,172,066 | 10/1979 | Zweigle et al. | 524/829 |

*Primary Examiner*—Joseph L. Schofer
*Assistant Examiner*—N. Sarofim
*Attorney, Agent, or Firm*—Burton, Parker & Schramm

[57] ABSTRACT

Described is an aqueous chip resistant coating composition exhibiting a viscosity of at least 5,000 centipoise, preferably containing binders with a high molecular weight, preferably at least 20,000. Although these coatings may be applied to a variety of substrates, for coating electrocoated substrates the following eight binders are particularly preferred: ethylene vinyl acetate copolymer, carboxylated ethylene vinyl acetate, epoxy functional acrylic resin, carboxylated styrene-butadiene resin, carboxylated acrylic, hydroxy functional acrylic, self-crosslinking acrylic; and carboxylated PVC acrylic. Generally, it is preferred to apply the chip resistant coating via an airless spray and the heat curing the coating.

20 Claims, No Drawings

AQUEOUS CHIP RESISTANT COATING COMPOSITION

This application is a division of application Ser. No. 417,857, filed Sept. 14, 1982, now U.S. Pat. No. 4,456,507, which is a division of U.S. Ser. No. 275,901, filed June 22, 1981, now abandoned.

DESCRIPTION

Background of the Invention

The invention is a latex based chip resistant coating composition and method for applying the composition. In particular, the invention is a filled latex composition exhibiting high viscosity and chip resistant qualities.

Description of Prior Art

Chip resistant coatings are not unknown. In fact, chip resistant plastisol compositions are known by the automobile companies, who have coated the lower portions of their vehicles with plastisol chip resistant coatings to protect the metal from paint cracking, rust enducing chips of stones and other abrasive materials commonly found on the streets. Previous to the introduction of these chip resistant coatings, these stones and other abrasive materials would be picked up and accelerated, by passing vehicles, against the painted bodies of nearby motor vehicles, thereby causing the paint to chip, exposing the underlying metal to rust and corrosion, and destroying the aesthetic effect of smooth continuous paint on the vehicle.

Although plastisol chip resistant coating compositions provided an answer to a technological, economic and aesthetic problem, the use of those compositions created problems of their own. These problems can best be appreciated by first considering what a plastisol is. A plastisol is a dispersion of finely divided resin in an organic compound, called a plasticizer. The plasticizer facilitates the coating process through its effect on the flow characteristics of the composition.

After applying the plastisol to the substrate to be coated, the substrate is usually baked at approximately 275° to 325° F. This baking temperature creates an economic problem as energy costs are increasing each year and an environmental problem as volatile organic plastisol waste products enter the atmosphere.

SUMMARY OF THE INVENTION

The present invention is an aqueous chip resistant coating composition, comprising:

(a) a film forming latex binder; and (b) a filler mixed with the binder to form a composition having a viscosity of at least 5,000 centipoise.

Preferably, this composition will be applied to an electrodeposited organic coating, dried by baking in an oven and then subsequently coated with a top coat. The top coat may be either the finish coat or it may be a primer which is subsequently dried and then coated with one or more layers of finish. Preferably, the chip resistant coating will be applied by spraying techniques, and the coating will preferably have a binder:filler ratio ranging from 10 to 90% binder: 90-10% filler and will exhibit a viscosity of at least 10,000 centipoise and most preferably at least 20,000 centipoise with a binder:filler ratio of 25 to 50% binder:75 to 50% filler.

The lack or low concentrations of organic solvents and plasticizers will reduce or eliminate the smoke stack pollution problem presented by the plastisols. Further, these materials should be dryable at lower temperatures than the plastisols so as to utilize less heat energy in the drying process, thereby reducing costs. Preferably, temperatures from ambient to 210° F. will be used, although higher temperatures can be used after the water has been released from the coating.

DISCLOSURE OF PREFERRED EMBODIMENTS

The invention is a chip resistant coating composition which, although it may be applied to almost any surface, will generally be applied to substrates or coated substrates subject to corrosion, such as iron, galvanized iron, aluminum and the like and will preferably be applied to substrates having a cathodically or anodically electrodeposited organic coating. The composition is, and may be characterized as, being a latex which contains an organic film forming binder. That is, the composition is a stable dispersion of a binder in an essentially aqueous medium. The binders which may be used in this invention may be polymers, block or graft polymers, or copolymers, although they are primarily and preferably copolymers.

While most latex/filler combinations appear to give a chip resistant coating, some combinations will provide better chip resistance than others. In general, the best latices are high molecular weight thermoplastic latices with a low Tg. This type of latex is a good binder for fillers which reinforce the latex, providing superior gravelometer resistance.

Specific adhesion of the latex to the substrate is very important. If the film is not firmly anchored to the substrate, stone impingement will break the film free from the substrate, causing cracking of the paint which has been applied over the coating. As is true of latex coatings in general, the degree and quality of adhesion will depend upon the particular latex-substrate combination chosen. Cold rolled steel and phosphate treated steel have been found to provide good adhesion substrates with a wide variety of latex coatings of the present invention. However, where the substrate is steel, primed with an electrodeposited paint, the choice of the correct latex for a given electrodeposited paint becomes more important. In some instances, the degree of chip resistance of a particular composition would be enhanced by the mixing of different binders.

Generally, any latex binder of the present invention may be used; however, for application to cathodically electrodeposited organic coatings, preferably, the binders used in this invention will be chosen from one of the following groups of copolymers.

a. ethylene vinyl acetate copolymer;
b. carboxylated ethylene vinyl acetate;
c. epoxy functional acrylic resin;
d. carboxylated styrene-butadiene resin;
e. carboxylated acrylic;
f. hydroxy functional acrylic;
g. self-crosslinking acrylic; and
h. carboxylated PVC acrylic.

Preferably, each of the copolymers used will have an average molecular weight of at least 50,000 and more preferably greater than 200,000.

Generally, the commercially available latexes utilizing these polymers are of relatively low viscosity in the range of approximately 200 centipoise. The coating of this invention, however, has a viscosity of at least 5,000 centipoise. In order to achieve this viscosity, additives are used, such as fillers and thickeners. By "filler" is meant a material which reinforces the coating composition and may or may not be inert. Although other fillers may be used, some of the commercially available fillers which may be used are the calcium carbonate fillers, such as Duramite, a trademark of the Thompson-Weinman Company; a talc, such as Emtal-41, a trademark of the Englehard Company; a clay, such as McNamee Clay, a trademark of the R. T. Vanderbilt Company; a calcium metasilicate, such as Wallastonite NYAD-400, a trademark of Interpace Company; a silicon dioxide, such as Imsil A-10, a trademark of Illinois Minerals, or Gold Bond R, a trademark of Tammsco; a sodium-potassium-aluminum silicate, such as Minex 7, a trademark of Kraft Chemical Company; a terephthalic acid, such as TA-33, a trademark of Amoco; a ground feldspar, such as LU-330, a trademark of Lawson United; a clay, such as AF-950, a trademark of the Englehard Company; a titanium dioxide, such as TR-900, a trademark of DuPont; an aluminum tri hydrate; a carbon black, such as Raven H-20, a trademark of Columbia Company; and a pyrogenic microsphere processed from fly ash, such as Orbaloid, a trademark of Midwest Filler Products. Preferably, the filler will be a fly ash derivative, such as the pyrogenic microspheres provided by Midwest Filler Products Company.

Surfactants may be beneficial. For example, where carbon black or pyrogenic microspheres are used, increased dispersion of the filler may be effectuated by addition of a surfactant, such as dimethyl hexynol like Surfynol 61, a trademark of Air Products, Inc. for acetylenic alcohols or glycols or their ethoxylated derivatives. Other surfactants may be used. However, preferably the surfactant will be a fugitive surfactant. That is, the surfactant is one that will leave the film of the applied coating. Based on the total solids content, the preferred weight ratio of binder or polymer to filler should range from about 10 to 90% binder to 90 to 10% filler. This binder percentage includes any non-volatile additives present.

In the formulation for the chip resistant coating composition to be applied to the substrate, there should be approximately 50 to 90% solids and 10 to 50% water. Preferably, the water content will only comprise from about 10 to 30% by weight of the overall composition while the solids content will range from 70 to 90%. Most preferably, the solids will range from 75 to 80%. Generally, the solids content includes binder, filler and non-volatile additives and should be high as possible in order to reduce the water needed to be removed.

Many of the conventional flow or filming aids enhance flow, minimize foaming and sometimes improve freeze-thaw stability while retarding the drying rate of the applied coating to enhance leveling and to promote a more continuous coating. Some film forming components include 2-ethylhexanol, methyl phenyl carbinol, ethylene glycol, diethylene glycol, acetophenone, butoxyethoxyethyl acetate, butylbenzylphthalate, dimethylformamide, undecanol, diacetone alcohol, ethylene carbonate, tetramethylene sulfone, dibutylstearamide, butoxyethoxyethanol, ethoxyethoxyethanol, alkyl monoethers of ethylene glycol, propylene glycol, and the like. Mixtures of these flow aids may also be used. One possible mixture would have the following relative amounts of components: 1 to 10 parts ethylene glycol; 5 to 10 parts 2-ethylhexanol; 10 to 25 parts methyl phenyl carbinol; 5 to 10 parts acetophenone. The use of a mixture such as this would allow the utilization of components that have desirable properties over and above their flow characteristics. For example, ethylene glycol would be used not only because of its flow characteristics but also because it would improve the freeze-thaw stability of a latex composition and would retard the drying rate of an applied coating so that better leveling and more continuous coatings would be realized. 2-ethylhexanol would be used because it would serve as an excellent anti-foam agent. Acetophenone and methyl phenyl carbinol would be used because of their relatively low cost and because they are emulsifiable solvents which soften the latex to allow formation of a continuous coating film even at room temperature.

Some additives which may be used are humectants, azeotroping agents, thickeners, and defoamers:

Due to the extremely high solids (70–90%) of this coating, without additives the coating would tend to dry on its outer surface first to form a skin. This is undesirable because skin formation or skinning traps water underneath, which leads to blistering, and because surface skins break off and become imbedded in the material, which causes the spray nozzel to clog.

To prevent undesirable clogging, a humectant is added in an effective amount. Some suitable humectants are hexylene glycol; ethylene glycol; glycerine; a defoamer of the high boiling mineral oil type modified with silicone, such as Colloids 681, a trademark of Colloids Corporation; butyl Carbitol, trademark of Union Carbide for butyl ether of diethylene glycol; methyl cellosolve acetate (MCA), trademark of Union Carbide for methyl ether of ethylene glycol acetate; propylene glycol; polypropylene glycol; and 2,2,4-trimethyl-1,3-pentane diol monoisobutyrate. At present, it appears that propylene glycol is the best of these.

Propylene glycol performs two functions in the system. First, it holds the film open so that the water can evaporate. Secondly, it imparts a measure of freeze thaw stability.

Even then, the coating may not dry fast enough. For this reason, an azeotroping agent, a water miscible organic solvent with a faster evaporation rate than water, is added. As the azeotroped mixture of solvent and water evaporates, it does so at a faster rate than the water would have. Some suitable azeotrope forming agents are acetone, methanol, isopropyl alcohol, and ethanol. Isopropyl alcohol appears to be the best azeotroping agent known for use with this invention.

Thickeners may also be added. Generally, thickeners are added in an amount sufficient to attain a desired viscosity and rheology. As a rule only small amounts will be used, preferably in the 5 to 10% by weight range. However, thickeners are not essential. The following are some of the commercially available thickeners which are acceptable for use with this invention: a polyvinyl methyl ether, such as Thickener LN, a trademark of GAF; a polyacrylate, such as Nalco 955-068, a trademark of Nalco Corporation; a dispersed acrylic thickener, such as Printing Concentrate 430, a trademark of Polymer Industries, Inc.; a clay, such as Attagel 50, a trademark of Englehard Company; and a kaolin clay, such as McNamee Clay, a trademark of R. T. Vanderbilt Company.

Defoamers may be used and are added to prevent or minimize foaming. A wide variety of defoamers may be used for this purpose. A few of the commercially available defoamers which may be employed are as follows: stearate type defoamers, such as Deefo M-165 and Deefo 495; an anionic stearate type defoamer, such as Deefo 972; and a silicone modified stearate type defoamer, such as Deefo 918, all trademarks of Ultra Adhesives Corporation; low silicone level defoamers, such as Nalco 2300, a trademark of the Nalco Corporation, and such as Patco 513 and Patco 577, trademarks of C. J. Patterson Company; a blend of soap, nonionic surfactant and petroleum hydrocarbon modified with low levels of silicone, such as Nopco NDW and Foamaster B, trademark of Diamond Shamrock Corporation; a blend of nonionic surfactant and petroleum hydrocarbon, such as Foamaster VL, trademark of Diamond Shamrock Corporation; a blend of silica derivatives and petroleum hydrocarbon, such as Foamaster S and Foamaster O, trademarks of Diamond Shamrock Corporation, a mineral oil type defoamer, such as Colloids 999, a trademark of Colloids Corporation; high boiling mineral oil type defoamers modified with silicone, such as Colloids 681, Colloids 675 and Colloids 694, trademarks of Colloids Corporation; and a silicon based defoamer, such as Antifoam 60, a trademark of General Electric Corporation.

Although cross-linking agents could be used, the coating compositions of this invention, with the exception of the self-crosslinking acrylic, are preferably thermoplastic.

The binders used generally have a Tg of less than 27° C. Tg is the glass transition temperature, sometimes called the "second order transition temperature" and is equivalent to the inflection temperature found by plotting the modulus of rigidity against temperature. Generally, all the latexes of this invention should have a Tg of less than −12° C. However, a Tg of less than 27° C. is acceptable.

The pH of the composition may range from 3 to 11. However, preferably the pH will range from 6 to 8.

The chip resistant composition of this invention may be formed in the following manner: First, a defoamer is added to a commercially available latex having a low viscosity, probably in the range of 200 centipoise. This mixture is slowly stirred during the addition of the filler, and stirring continues until the mixture has a smooth and consistent texture. At this point, other additives, such as humectants, azeotropic agents, thickeners and the like, may be added with further stirring until the composition again becomes smooth and has a consistent texture. This entire mixing process preferably takes place at room temperature, although temperatures of from 10° C. to 82° C. are acceptable.

Based on the overall weight of the composition, the composition should be comprised of approximately 10 to 30% by weight water, 9 to 90% by weight binder, and 9 to 68% filler.

This mixture can now be placed in a spray apparatus and sprayed upon the substrate to be coated. A preferred spray method is airless spray. Examples of possible processing systems are as follows:

System 1—A metal part is conversion coated (optional), electrocoated with coating composition (well known cathodic or anodic techniques), and baked. Then the chip resistant coating of this invention is spray applied. While the coating is still wet, a water borne primer or primer-surfacer (also called primer herein) is spray applied. The primed part is then dried via incremental heat increases, the first of which being 20 minutes at 93° C., and the remainder as specified by the primer supplier.

After the part returns to ambient temperature a top or finish coat of paint, which may be water or solvent borne or high solids (50%–100%) by weight, is spray applied. The painted part is then cured according to a bake schedule recommended by the topcoat supplier.

System 2—The Preferred System—A metal part is conversion coated (optional), and electrocoated with coating composition (cathodic or anodic) as in System 1. While the part is still hot from the electrocoat bake, the chip resistant coating of this invention is spray applied. After an hour at ambient temperature, or intermittent exposure to radiant heat, or 20 minutes at 93° C., the coating will be dried.

The coating may or may not be covered with a spray applied primer, which may be water or solvent borne, and dried according to the bake schedule for that primer.

After the part returns to ambient temperature, a top or finish coat, which may be water or solvent borne or high solids, is spray applied. The painted part is then cured according to a bake schedule recommended by the top coat supplier.

System 3—A metal part is conversion coated (optional) and electrocoated with coating composition (anodic or cathodic). While the part is still wet from the electrocoat dip tank, the chip resistant coating of this invention is spray applied in specified areas. The part is then baked according to the bake cycle recommended for that electrocoat paint.

The coating may or may not be covered with a spray applied primer, which may be water or solvent borne, and dried according to the bake schedule for that primer.

After the part returns to ambient temperature a top or finish coat, which may be water or solvent borne or high solids, is spray applied. The painted part is then cured according to a bake schedule recommended by the top coat supplier.

System 4—The part is conversion coated and dried. Although it is not electrocoated, the chip resistant coating of this invention is spray applied, and then may be primed and painted per System 1 and System 2.

System 5—Non-electrocoat dip primers may be substituted for the electrocoated primer in System 1, System 2 and System 3.

The chip resistant coating applied in each of the above systems has a viscosity of at least 5,000 centipoise. Generally, the viscosity of the coating composition will fall within the range of 10,000 to 50,000 centipoise; and the thickness of the dried coating will range from 2 to 12 mils, as opposed to the 15 to 35 mil thickness for presently used plastisol compositions. Because of the high viscosity of the composition, a slight degree of orange peel effect may be anticipated. However, smooth surfaces having no orange peel effect are obtainable.

Although airless spray applications are preferred, the chip resistant coating of this invention may be applied by brush, roller, draw knife, dip coating and the like.

In order to evaluate the compositions of this invention a gravelometer test was run as follows:

Gravelometer Test

This is an impact test used by the automotive industry to simulate flying pebbles and rocks under highway conditions. A panel is suspended in a metal frame and blasted with five pints of quarter-inch limestone chips propelled from an orifice by a 70 p.s.i.g. air blast. Rating of the test coatings is made by comparison to a standard.

Having described the invention in general, listed below are the embodiments, wherein all parts are parts by weight and all temperatures are in degrees Centigrade unless otherwise indicated. As the examples show, the materials of this invention perform in an acceptable manner when tested in accordance with automotive standards.

EXAMPLE 1

To 8000 parts of the ethylene vinyl acetate (EVA) polymer Airflex 500, trademark of Air Products for a water based latex, is first added 80 parts of the defoamer Nopco NDW, trademark of Diamond Shamrock Company; then 240 parts of the dispersed acrylic thickener Printing Concentrate 430, trademark of Polymer Industries, Inc.; 32 parts of a dimethyl hexynol, Surfynol 61, trademark of Air Products, Inc., which is a surfactant which serves as a dispersing aid for the filler; 400 parts of propylene glycol; 400 parts of isopropanol; 10,000 parts of pyrogenic microsphere, Orbaloid, trademark of Midwest Filler Company. Throughout the addition process, the EVA and the admixture is mixed until a creamy, smooth texture is achieved. The aqueous chip resistant coating material is applied to an electrocoated steel panel by spraying with a Graco 30:1 Bulldog pump at 70 psi with a 415 reverse-a-clean 3 spray tip having a 15/1000 inch orifice which throws an 8 inch fan 12 inches from the target area. The sprayed composition is primed without drying of the chip resistant coating with the water based primer acrylic paint U32AD205, trademark of Inmont Corporation, before drying. After a 2 minute flash at ambient, the temperature is gradually increased to 163° C. over a 7 minute period and baked for 35 minutes. The water based metallic topcoat acrylic paint E91BD161, trademark of Inmont Corporation, is applied and dried using first a 10 minute flash, then 10 minutes at 82° C., then 20 minutes at 121° C., and finally 30 minutes at 163° C. The coating exhibits very good adhesion, gravelometer and appearance. The Brookfield viscosity using RVF #5 spindle at 10 rpm is 23,600 cps but increases overnight to 35,200 cps. The Seevers viscosity of 11.9 sec. at 40 psi using a 20 g. mass and a 0.051" orifice did not change with time as did the Brookfield viscosity.

EXAMPLE 2

75 parts of the ethylene vinyl acetate polymer Airflex 500, trademark of Air Products for a water based latex, and 25 parts of the carboxylated ethylene vinyl acetate polymer Airflex 416, trademark of Air Products for a water based latex, are placed in a mixing apparatus. To this mixture is first added 1 part of the high boiling mineral type defoamer modified with silicone Colloids 681, trademark of Colloids Corporation, and then 125 parts of the silicon dioxide Gold Bond R filler, trademark of Tammsco, while mixing until a smooth textured composition is obtained. The aqueous composition has an original viscosity of 20,000 cps. When applied to a dry cathodically electrocoated steel surface using conventional cathodic electrocoat techniques and heat cured at 93° C. for 20 minutes, it provides a tough coating with very good adhesion having a film thickness of 12 mils. The dried coating was primed, the primer was baked, then top coated, and baked according to the schedule in Example 1 to provide a finished product which exhibited very good gravelometer test results.

EXAMPLE 3

Using the procedure of Example 2, first 1 part high boiling mineral type defoamer modified with silicone Colloids 681, trademark of Colloids Corporation, and then 125 parts of the silicon dioxide Gold Bond R, trademark of Tammsco, were added to 75 parts of the epoxy acrylic E-1681, trademark of Rohm & Haas Company, and 25 parts of the ethylene vinyl acetate polymer A-416, trademark of Air Products Company. When applied and heat cured to an electrocoated surface, the composition provided a good film with very good to excellent adhesion properties. A water reducible primer/surfacer acrylic paint U-32-AD-203, trademark of Inmont Corporation, was applied to the dried coat and baked 20 minutes at 93° C. and then 30 minutes at 163° C. Then a top coat was applied to the primer and baked as in Example 1. Both the top coat and the primer were very good. The gravelometer test on the finished product was also good.

EXAMPLE 4

Using the procedure of Example 2, first 1 part of the high boiling mineral type defoamer modified with silicone Colloids 681, trademark of Colloids Corporation, and then 125 parts of the silicon dioxide Gold Bond R, trademark of Tammsco, were added to 30 parts of the carboxylated styrene butadiene resin Dow 277, trademark of Dow Chemical Corporation, and 70 parts of the carboxylated styrene butadiene resin PL-208, trademark of Polysar, Inc., to provide an aqueous chip resistant coating composition. This coating composition was applied to an electrocoated steel panel to provide a coating which exhibited a very good gravelometer test, although film tears indicated that the film was subject to skin formation during drying.

EXAMPLE 5

Using the procedure of Example 2, first 1 part of the high boiling mineral type defoamer modified with silicone Colloids 681, trademark of Colloids Corporation, and then 125 parts of the silicon dioxide Gold Bond R, trademark of Tammsco, were added to 75 parts of the ethylene vinyl acetate Airflex 500, trademark of Air Procucts Company, and 25 parts of the styrene butadiene resin 1800-X-73, trademark of B. F. Goodrich Company, to provide a water base chip resistant coating composition. When applied to Bonderized (trademark of Oxy Metal Industries for a phosphate treatment), non-electrocoated steel panel, this composition exhibited good adhesion and good gravelometer. When applied to an electrocoated steel panel, the gravelometer results were only fair.

EXAMPLE 6

Using the procedure of Example 2, first 1 part of the high boiling mineral type defoamer modified with silicone Colloids 681, trademark of Colloids Corporation, and then 125 parts of the silicon dioxide Gold Bond R, trademark of Tammsco, were added to a mixture containing 50 parts of the ethylene vinyl acetate A-500, trademark of Air Products, Inc., 25 parts of the styrene butadiene resin 1800-X-73, trademark of B. F. Goodrich Company, and 25 parts of the ethylene vinyl acetate A-416, trademark of Air Products, Inc., to provide a water based chip resistant coating composition. When applied to a Bonderized, non-electrocoated steel panel and heat cured, this composition exhibited very good gravelometer test results. When applied to an electrocoated steel panel, the gravelometer results were good, but not as good as for the non-electrocoated, Bonderized substrate.

EXAMPLE 7

Using the procedure of Example 2, first 1 part of the high boiling mineral type defoamer modified with silicone Colloids 681, trademark of Colloids Corporation, and then 150 parts of the silicon dioxide Gold Bond R, trademark of Tammsco, were added to 100 parts of the carboxylated acrylic UCAR 822, trademark of Union Carbide, to provide a water based chip resistant coating composition. When the composition was applied to a cathodically electrocoated steel panel and heat cured, the coating exhibited good adhesion and good gravelometer results.

EXAMPLE 8

Using the procedure of Example 2, first 1 part of the high boiling mineral type defoamer modified with silicone Colloids 681, trademark of Colloids Corporation, and then 150 parts of calcium carbonate were added to 100 parts of the hydroxy functional acrylic Rhoplex E1024, trademark of Rohm & Haas, to provide a water based chip resistant coating composition. When the composition was applied to a cathodically electrocoated steel panel and heat cured, the coating exhibited excellent adhesion and good gravelometer test results.

EXAMPLE 9

Using the procedure of Example 2, 1 part of the high boiling mineral type defoamer modified with silicone Colloids 681, trademark of Colloids Corporation, and 150 parts of calcium carbonate were added to 100 parts of the self-crosslinking acrylic Rhoplex CA12, trademark of Rohm & Haas. When applied to a cathodically electrocoated steel panel and heat cured, the coating exhibited good adhesion and good gravelometer test results.

EXAMPLE 10

Using the procedure of Example 2, 1 part of the high boiling mineral type defoamer modified with silicone Colloids 681, trademark of Colloids Corporation; 125 parts of the silicon dioxide Gold Bond R, trademark of Tammsco; and 5 parts glycerin were added to 100 parts of the carboxylated polyvinyl chloride acrylic Hycar 460X45, trademark of B. F. Goodrich Company. When applied to a cathodically electrocoated steel panel and heat cured, the coating exhibited good adhesion and good gravelometer test results.

We claim:

1. An aqueous chip-resistant coating composition capable of being applied to a substrate, comprising (a) about 50 to about 90 percent by weight (pbw) film-forming latex binder selected from the group consisting of:

(i) an ethylene vinyl acetate copolymer;
(ii) a carboxylated ethylene vinyl acetate;
(iii) epoxy functional acrylic resin;
(iv) carboxylated styrene-butadiene resin;
(v) carboxylated acrylic;
(vi) hydroxy functional acrylic;
(vii) self-crosslinking acrylic; and
(viii) carboxylated polyvinyl chloride acrylic, and mixtures thereof, dispersed in the water;

(b) about 10 to about 50 pbw filler mixed with the binder to form a composition having a viscosity of at least 5000 centipoise; and (c) an effective amount of a humectant.

2. The coating composition of claim 1 wherein viscosity ranges from 15,000–60,000 centipoise.

3. The coating composition of claim 1 wherein viscosity ranges from 15,000–40,000 centipoise.

4. The coating composition of claim 1 wherein the latex binder is composed of particulates, each particulate having a diameter of less than 5 microns.

5. The coating composition of claim 1 wherein the latex binder is composed of particulates, each particulate having a diameter ranging from 1 to 5 microns.

6. The coating composition of claim 1 wherein the binder is an ethylene vinyl acetate copolymer.

7. The coating composition of claim 1 wherein the binder is a carboxylated ethylene vinyl acetate.

8. The coating composition of claim 1 wherein the binder is an epoxy functional acrylic resin.

9. The coating composition of claim 1 wherein the binder is a carboxylated styrene-butadiene resin.

10. The coating composition of claim 1 wherein the binder is a carboxylated acrylic resin.

11. The coating composition of claim 1 wherein the binder is a hydroxy functional acrylic resin.

12. The coating composition of claim 1 wherein the binder is a self-crosslinking acrylic resin.

13. The coating composition of claim 1 wherein the binder is a carboxylated polyvinyl chloride acrylic.

14. The coating composition of claim 1 wherein the filler is selected from the group consisting of:

(a) calcium carbonate;
(b) talc; and
(c) pyrogenic microspheres.

15. The coating composition of claim 1 wherein the humectant is a propylene glycol.

16. The coating composition of claim 1 further comprising an effective amount of defoamer.

17. The coating composition of claim 16 wherein less than 5 percent defoamer is present.

18. The coating composition of claim 1 further comprising an effective amount of a thickening agent.

19. The coating composition of claim 1 further comprising an effective amount of an azeotroping agent.

20. The coating composition of claim 1 further comprising an effective amount of surfactant.

* * * * *